United States Patent
Ross et al.

[11] 3,874,703
[45] Apr. 1, 1975

[54] ROLL TRAILER HITCHING APPARATUS

[75] Inventors: Douglas Ross, Bellevue; Hans H. Herrmann; Harley Robert Renschler, both of Seattle, all of Wash.

[73] Assignee: CTEC Corporation, Bellevue, Wash.

[22] Filed: July 22, 1974

[21] Appl. No.: 490,248

[52] U.S. Cl. .......................... 280/425 R, 214/505
[51] Int. Cl. .............................................. B62d 53/06
[58] Field of Search..... 280/425 A, 423 B; 214/505, 214/506

[56] References Cited
UNITED STATES PATENTS

| | | | |
|---|---|---|---|
| 2,590,210 | 3/1952 | Rogers | 280/425 A X |
| 2,963,302 | 12/1960 | Ronk | 280/425 A |
| 3,450,417 | 6/1969 | Cramer et al. | 280/425 A |
| 3,729,215 | 4/1973 | Paakkinen | 280/425 A |
| 3,764,166 | 10/1973 | Fiala | 280/425 A |

*Primary Examiner*—Leo Friaglia
*Attorney, Agent, or Firm*—Christensen, O'Connor, Garrison & Havelka

[57] ABSTRACT

A gooseneck connector is mounted on a vertically adjustable fifth wheel on a powered vehicle. The connector can be coupled to a roll trailer to hitch the vehicle to the trailer by inserting a rearwardly extending lower arm of the connector into a receptacle in the front of the trailer and thereafter elevating the connector relative to the vehicle, thereby lifting the forward end of the trailer. The connector and the trailer are provided with mutually engageable load bearing and primary locking members, operable upon elevation of the connector, which respectively distribute the vertical loads of the trailer on the connector and lock the connector within the receptacle.

In one embodiment a safety latch is provided to prevent premature uncoupling of the connector from the receptacle in the event the primary locking mechanism becomes unlocked. The safety latch includes a member which projects upwardly from the upper surface of the rearwardly extending arm of the connector, which upon partial withdrawal of the arm from the receptacle can engage a rearwardly facing surface on a beam positioned in the upper forward position of the receptacle. In another embodiment the trailer is provided with flange members which project forwardly from each side of the receptacle. The extension members have downwardly facing recesses which are engageable with a pin mounted transversely through the neck portion of the connector to lock the connector to the trailer. The extension members and pin also provide a visual indication of the position of the connector within the receptacle. An upwardly and forwardly inclined cam surface is provided on the flange members forwardly of the recess. If an attempt is made to lock the connector to the trailer when the connector is only partially inserted into the receptacle, the pins engage the cam surface and cause the trailer and connector to move in mutually opposing directions to prevent a false coupling condition and to provide a distinct visual indication that the connector is not locked to the trailer.

6 Claims, 7 Drawing Figures

3,874,703
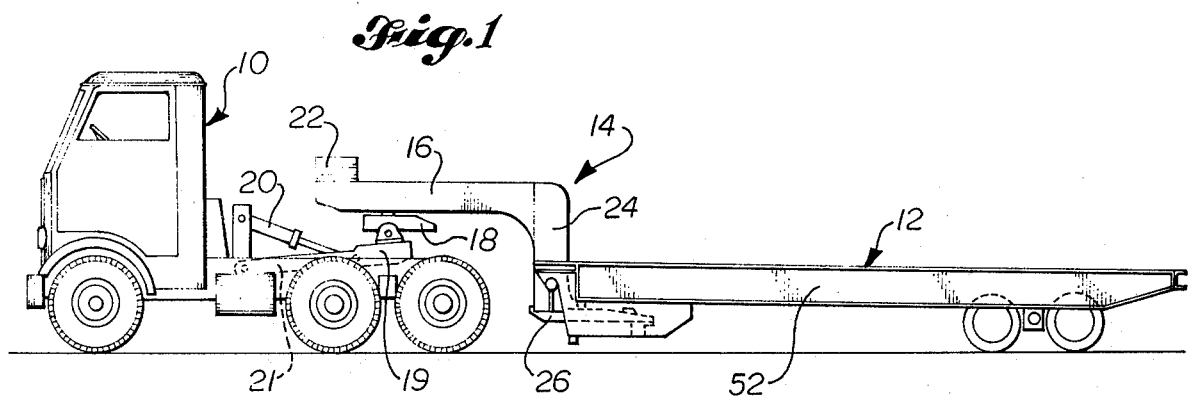
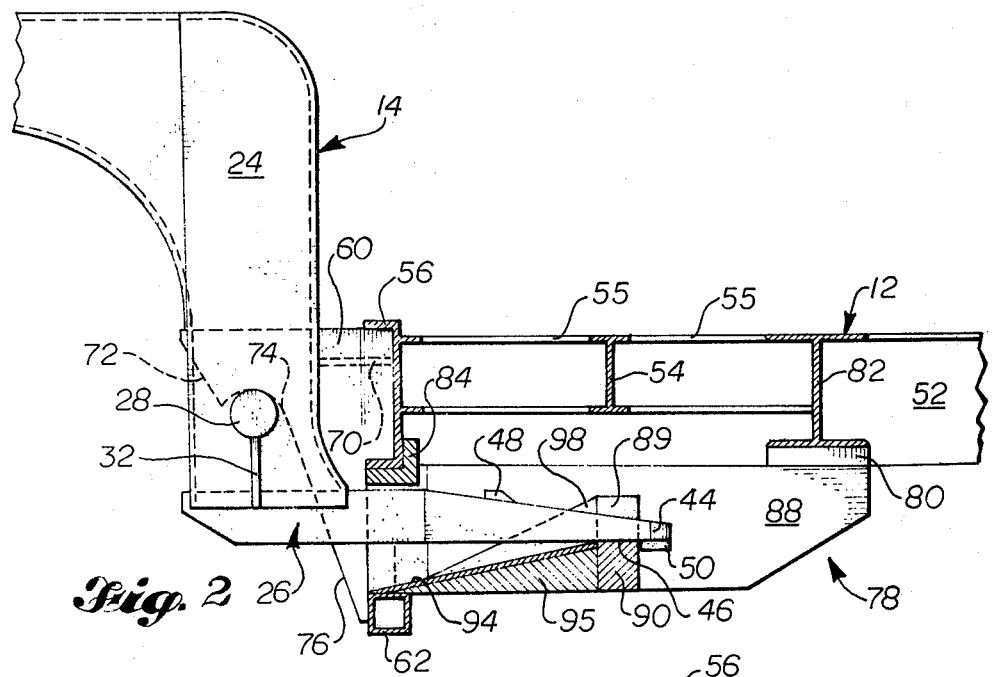
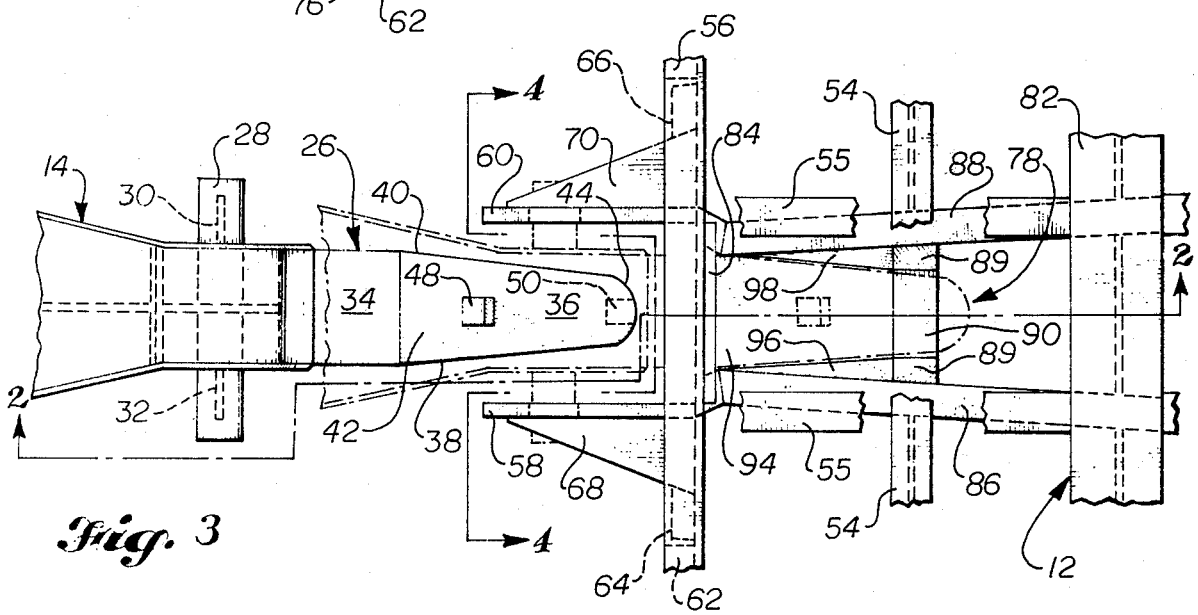

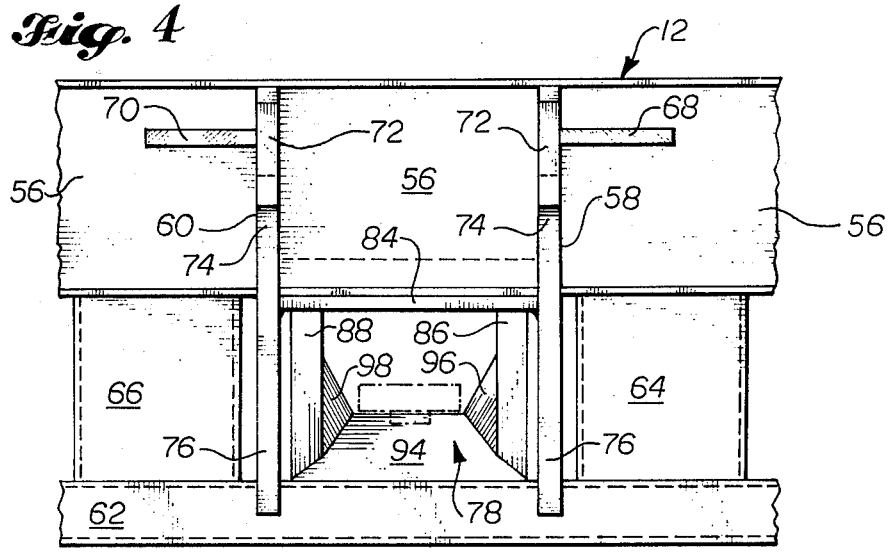
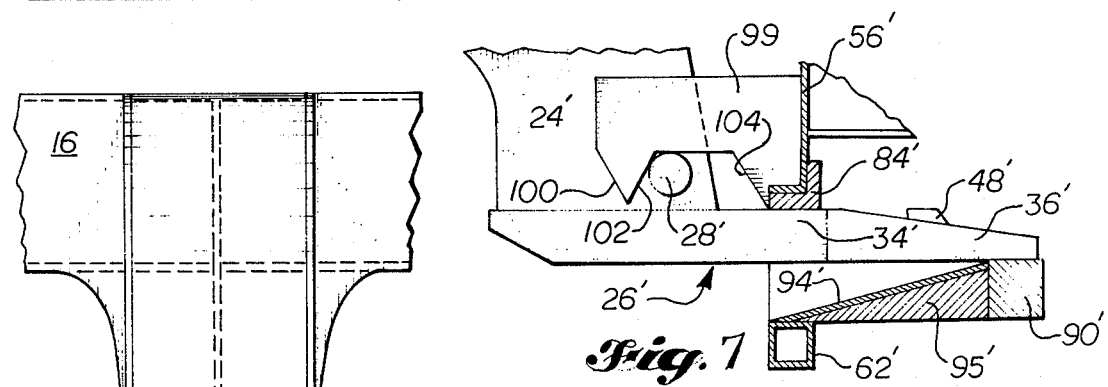
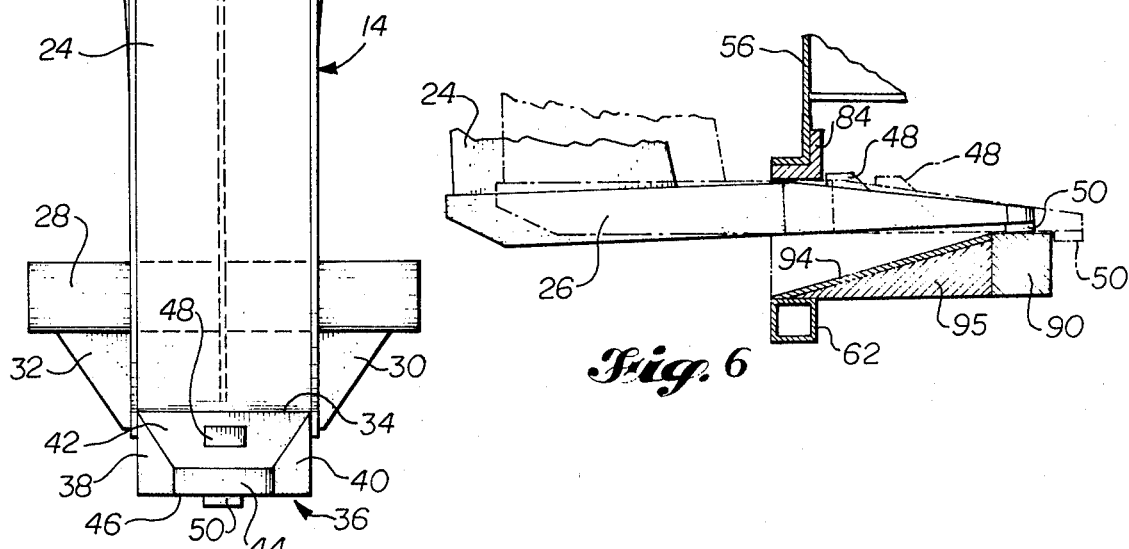

ROLL TRAILER HITCHING APPARATUS

BACKGROUND OF THE INVENTION

This invention relates to apparatus for hitching a powered vehicle to a roll trailer and, more particularly, to an improved locking mechanism for insuring that a gooseneck connector, mounted on a powered vehicle, is securely latched within an appropriate receptable in a roll trailer, and to a safety latch mechanism for preventing premature uncoupling of a gooseneck connector from a roll trailer should the primary locking mechanism become disengaged.

Present roll trailer hitching apparatus comprises a gooseneck connector having an upper, forwardly extending arm, pivotally mounted on a vertically adjustable fifth wheel on a powered vehicle, which a fixed to a lower, rearwardly extending arm by an intermediate, vertically extending neck. The rearwardly extending arm terminates in a rearwardly tapering, coupling portion which is insertable in a forwardly opening receptacle on a roll trailer. Such trailers typically are semi-trailers utilized in so-called roll-on, roll-off traffic in which the semi-trailer is driven onto a ship with its load, then shipped with cargo, and driven off the ship at destination. A variety of powered vehicles are employed to move the roll trailers, including relatively conventional truck tractors outfitted with a vertically adjustable fifth wheel. Fork lift type cargo vehicles fitted with a fifth wheel on the fork lift are also used to move the trailers. The coupling receptacle on the roll trailer includes a pair of spaced, rearwardly extending sidewalls, and typically, upper and lower walls which join the upper and lower extents of the sidewalls. Load bearing members are provided in the lower rear portion of the receptacle and in the forward, upper portion of the receptacle. When the rearwardly extending arm of the connector is inserted in the receptacle, the rearward portion of the arm can engage the rearward load bearing member and the forward portion of the arm can engage the upper load bearing member as the fifth wheel is elevated to raise the connector. When the connector is elevated to a sufficient extent, the forward portion of the roll trailer is raised off the ground and is ready for movement on or off a ship.

Prior art gooseneck connectors are securely coupled in the receptacle by a primary latching mechanism. One type of latching mechanism comprises mutually engageable members appropriately mounted on the connector and in the receptacle, which coact to prevent withdrawal of the connector, under most circumstances, when the connector is elevated relative to the vehicle. The primary latching mechanism comprises a latch block which projects a short distance downwardly from the bottom surface of the rearward portion of the rearwardly extending arm. When the connector is fully inserted in the receptacle and is elevated, the forwardly facing surface of the latch block engages a rearwardly facing surface, normally provided on the rearward portion of the lower rearward load bearing member of the receptacle, thereby locking the connector in the receptacle. To unlatch the connector from the receptacle, the connector is lowered relative to the vehicle. After the forward portion of the trailer is resting on the ground, the rear portion of the rearwardly extending arm is pivoted upwardly to disengage the latch block from the rearwardly facing surface in the receptacle. The pivotal movement of the connector occurs about an axis transverse to the vehicle. When a tractor is used, the fifth wheel is normally mounted to freely pivot about such a transverse axis while the forward end of forwardly extending arm is counterweighted to maintain the rearward arm in an upwardly pivoted position when it is unloaded. When a fork lift truck is used, the fifth wheel is normally affixed to the fork while the pivoting action for the connector is provided through the fork and the uprights, which are conventionally mounted for powered pivotal movement about an axis transverse to the fork lift truck.

The foregoing roll trailer coupling apparatus has proved to be the simplest and most effective means for quickly and efficiently coupling and uncoupling roll trailers from a powered vehicle in a cargo handling operation. A major disadvantage which has existed is that the connector has a tendency to become uncoupled from the trailer when rough or undulating terrain is encountered at normal transport speeds, resulting in separation of the trailer from the powered vehicle with sometimes disastrous consequences. Another major disadvantage of the prior art coupling system is that no locking will occur if the rearwardly extending arm is not fully inserted in the receptacle prior to elevating the connector, although to the average operator it might appear that coupling has occurred, resulting in what is termed herein a false coupling condition. This condition can also cause separation of the powered vehicle from the trailer with the same attendant consequences following from an uncoupling of the trailer from the vehicle.

Although prior to the present invention no adequate solution has been found to prevent separation of the trailer from the powered vehicle if false coupling has occurred or if actual uncoupling occurs, and aid to help prevent false coupling has been developed. This aid comprises an exterior primary latch mechanism from which a visual indication of coupling can be derived. One form of external primary latch comprises flanges which are mounted on the trailer on both sides of the receptacle mouth to project forwardly from the trailer and flank both sides of the neck of the connector. Downwardly opening recesses are provided in the flanges. A pin or bar, extending transversely outwardly from the neck of the connector, is located to engage the downwardly opening recesses when the connector is fully inserted in the receptacle and elevated relative to the vehicle, thus providing an external, visual indication of latching. The flange members have been designed to be both load bearing and now load bearing.

Despite these improvements, inattentive vehicle operators have still managed to create a false coupling condition and lose the trailers which they are pulling. In addition, the problem of the trailer separating from the vehicle in the event of false coupling or uncoupling has not been resolved.

Accordingly, it is a principal object of the present invention to provide a safety latch mechanism which will be effective to prevent separation of the trailer from the vehicle should a false coupling condition occur or should the primary latch mechanism become uncoupled. It is another object to provide a safety latch mechanism which can be easily and effectively incorporated into the prior art coupling apparatus with little or no structural modification. It is another object to provide a safety latch mechanism which will not interfere with the normal uncoupling procedure for the prior art apparatus. In another aspect, it is an object of the present invention to provide means to aid in preventing a false coupling with an external coupling apparatus. It is a further object to provide a means operable with an external coupling apparatus to exaggerate the visual indication of a false coupling condition.

SUMMARY OF THE INVENTION

According to the foregoing objects, and other objects which will become apparent upon reading the specification, a first aspect of the present invention provides a safety latch mechanism which will prevent separation of the trailer from the connector in the event of a false coupling or an uncoupled condition. The safety latch mechanism comprises in combination a latch block member projecting upwardly from the central portion of the upper surface of the rearwardly extending arm of the connector. The receptacle on the trailer is provided with a beam which has a rearwardly facing surface. The safety latch block engages this surface as the connector is withdrawn from the receptacle, but only when the connector is elevated relative to the vehicle, thus preventing premature withdrawal of the connector from the receptacle. The safety latch mechanism will not interfere with the normal uncoupling procedure when the connector is lowered relative to the vehicle.

In another aspect, the present invention provides an external primary latching mechanism which includes means for preventing a false coupling condition combined with a visual indication that coupling has occurred. The external coupling comprises a flange oriented generally parallel to the longitudinal axis of the trailer and a bar which is oriented generally transverse to the flange. In the preferred embodiment the flange is affixed to and projects forwardly from the trailer while the bar is fixed to the neck of the connector and projects sidewardly therefrom. The flange has a downwardly opening recess or notch which the bar engages as the connector is elevated relative to the trailer when the rearwardly extending arm of the connector is freely inserted in the receptacle to securely lock the connector in the receptacle. The flange is provided with cam surfaces to facilitate a coupled condition and to prevent a false coupling when the rearward arm of the connector is not fully inserted in the receptacle before the connector is elevated. A first cam surface extends upwardly and forwardly from a location adjacent to the recess in the flange. When the rearward arm of the connector is not fully inserted in the receptacle, the bar will engage the first cam surface and cause the trailer and connector to move in mutually opposing directions as the connector is elevated relative to the trailer. In this manner a false coupling is prevented since the connector will no longer be inserted far enough to effectively lift the trailer off the ground.

BRIEF DESCRIPTION OF THE DRAWINGS

A better understanding of the present invention can be derived by reading the ensuing specification in conjunction with the accompanying drawings wherein:

FIG. 1 is a side elevation view of a tractor coupled to a roll trailer by the hitching apparatus according to one aspect of the present invention;

FIG. 2 is an enlarged vertical, longitudinal sectional view of the hitching apparatus fo FIG. 1 taken along a section line similar to line 2—2 of FIG. 3, illustrating the gooseneck connector in a fully inserted position;

FIG. 3 is an enlarged plan view of the hitching apparatus of FIG. 1 with parts of the trailer load platform and the connector broken away, illustrating the gooseneck connector in solid lines positioned forwardly of the receptacle and in broken lines at its fully inserted position in the receptacle;

FIG. 4 is an enlarged front elevation view of the receptacle portion of the hitching apparatus of FIG. 1 taken along line 4—4 of FIG. 3, illustrating in broken lines a section of the rearward end of the gooseneck connector locked in the receptacle;

FIG. 5 is an enlarged rear elevation view of the gooseneck connector;

FIG. 6 is a side elevation view in partial cross section of a modified and preferred form of the hitching apparatus of the present invention illustrating the gooseneck connector in broken lines in its locked position and in solid lines in its unlocked position; and FIG. 7 is a side elevation view in partial cross section of a third modification of the present invention.

DESCRIPTION OF PREFERRED EMBODIMENTS

In the figures, like reference numerals are used to designate like elements of the apparatus. Referring first to FIG. 1, suitable powered tractor (or other suitable vehicle) 10 is hitched to a roll trailer (or semi-trailer) 12 by a gooseneck connector, generally designated 14. The gooseneck connector is so-called because of its shape comprising a forwardly extending, upper arm 16 and a rearwardly extending lower arm 26 interconnected by a vertically oriented neck portion 24. Although the gooseneck connector 14 is manufactured from several pieces, it is suitably welded together to form an integral unit. The upper arm 16 of the gooseneck connector is removably and pivotally mounted on a fifth wheel 18. The wheel 18 is mounted on a base 19 for pivotal movement about an axis generally transverse to the tractor 10. The base 19 has a forwardly extending arm 21 which is in turn pivotally mounted to the central position of the frame of the tractor 10 for swinging movement about an axis also transversely oriented relative to the tractor 10. The base 19 is swung about its pivotal mounting by a suitable hydraulic piston and cylinder unit 20 to lower and elevate the fifth wheel 18, and consequently the connector 14, relative to the truck 10. A counter weight 22 is mounted on the forward end of the upper arm 16 at a location forward of its pivotal mounting to the fifth wheel 18. The counter weight 22 is sized to cause the lower arm 26 to pivot upwardly about the pivotal axis of the fifth wheel in order to prevent the lower arm from dragging on the ground when it is uncoupled from the trailer and to facilitate coupling and uncoupling of the connector. To couple the connector to the trailer, the rearwardly extending arm 26 of the connector 14 is inserted in a receptacle provided in the forward portion of the roll trailer 12 while the connector is in a lowered position relative to the vehicle 10. Thereafter, the connector 14 is elevated relative to the vehicle to lift the forward portion of the roll trailer 12 off the ground, preparing it for transit to or from a ship or other cargo storage area. The primary latching mechanism as well as the safety latching mechanism will be described in greater detail below.

To better understand the operation of the coupling system and the component parts of the embodiment shown in FIG. 1, reference will first be made to FIGS.

2, 3 and 4 for a description of the receptacle in the forward portion of the trailer. Thereafter, reference will be made to FIGS. 2, 3 and 5 for detailed description of the gooseneck connector of this embodiment of the invention. After the receptacle and connector have been defined, the manner of operation of the receptacle and the function of the safety latching mechanism and the apparatus which assists in preventing false couplings in this embodiment will be described. Thereafter, a preferred embodiment of the invention will be described in relation to FIG. 6 and a third embodiment will be described in relation to FIG. 7.

As best shown in FIGS. 2, 3 and 4, the roll trailer 12 has a framework which typically includes a plurality of longitudinal supporting girders 52 interconnected along the length of the trailer by a plurality of transverse I-beam stringers 54. Additional longitudinal stringers 55 are provided between the longitudinal girders 52. The trailer platform is formed by the transverse and longitudinal stringers and girders overlaid with wooden planking (not shown). The forward end of the trailer framework includes a transverse, forwardly opening channel 56, the rear side of the web of which is welded to the forward ends of the longitudinal girders 52 and stringers 55. The number, size, and spacing of the longitudinal and transverse stringers depends upon the desired load bearing capacity of the roll trailer.

A pair of spaced, vertically elongated, hook-like, load bearing extensions 58 and 60 project forwardly from the forward channel 56 and a lower transverse box beam 62, dependedly mounted below the forward channel 56 by a pair of vertical, rearwardly opening channels 64 and 66 (FIG. 4). In addition to serving as a lower bracing point for the forward load bearing extensions 58 and 60, the lower box beams 62 also functions as a ground supporting anchor for the forward end of the roll trailer when it is at rest. The load bearing extensions 58 and 60 are respectively braced for transverse loading by a pair of triangular horizontal webs 68 and 70 positioned between the outwardly facing surfaces of the extensions and the forwardly facing surface of the webs of channel 56. As best shown in FIG. 2, the forward edges of the load bearing extensions 58 and 60 include a downwardly and rearwardly sloping, forward, upper cam edge 72 terminating in downwardly opening, semicircular load bearing recess or notch 74 which, in turn tangentially merges with a downwardly and rearwardly sloping aligning edge 76 positioned downwardly and rearwardly of the recess 74.

As best shown in FIGS. 2, 3, and 4, a receptacle 78 depends from the forward end of the roll trailer framework. The receptacle 78 includes a pair of longitudinal sidewalls 86 and 88 (FIG. 3), which first mutually converge and thereafter mutually diverge in a rearward direction. The rear ends of these sidewalls are suspended from a mounting plate 80 on a reinforced-vertically enlarged transverse I-beam 82, and forward ends of these sidewalls are mounted from the forward channel 56 by means of an angle iron 84 which serves as a load block. The load block (or angle iron) 84 extends transversely between the forward extensions 58 and 60 and defines the upper boundary of a forwardly opening, generally planar, receptacle mouth. The forward channel 56 and the lower box beam 62 are positioned so that their forwardmost surfaces are substantially coincident with the plane of the mouth. The width of the mouth is defined by the point of maximum convergence of the sidewalls 86 and 88, between which the lower arm 26 of the gooseneck is insertable.

The receptacle further includes a locking and load bearing beam 90 mounted at the rearward end of the receptacle between the sidewalls 86 and 88. The lower wall of the receptacle 78 is formed by an upwardly inclined ramp 94, the forward edge of which extends rearwardly from the upper forward edge of the lower box beam 62 and terminates at the upper, forward edge of the rear load bearing beam 90. The ramp 94 is reinforced along its length by a wedge-shaped plate 95. As best shown in FIG. 4, a pair of flared guide walls 96 and 98 are supported between the ramp 94 and the divergent portions of the sidewalls 86 and 88. The guide walls 96 and 98 are mutually inclined downwardly and inwardly and extend rearwardly in mutually converging relationship from the point of maximum convergence of the receptacle sidewalls 86 and 88 to the forward edges of the locking beam 90. A pair of mutually opposed, upwardly and outwardly flaring, guide plates 89 are positioned rearwardly of the guide walls 96 and 98. The lower edges of these plates merge into the upper surface of the locking beam 90 while the upper edges merge into the respective sidewalls 86 and 88. The forward converging sections of the receptacle sidewalls 86 and 88 cooperate with the ramp 94 and the flared guide walls 96 and 98 to guide the lower arm 26 of the gooseneck into its coupled positioned.

As best shown in FIGS. 3 and 5, the lower arm 26 of the gooseneck connector includes an intermediate portion 34 of uniform thickness and width which extends forwardly from and is integral with a rearwardly tapered male portion 36. The male portion 36 is inwardly convergent in both thickness and width proceeding rearwardly from the intermediate portion 34. The male portion 36 includes a pair of mutually converging vertical sides 38 and 40 between which extend a top surface 42 inclined to a substantially horizontal bottom surface 46. The male portion 36 terminates in a rounded nose 44.

A safety locking member (or latch plate) 48 projects upwardly from the top surface 42 between the ends of the male portion 36. The latch plate has a width substantially equal to its length and extends upwardly about one inch from the upper surface 42 of the male portion 36. The rear surface of the latch plate tapers downwardly and rearwardly to prevent the latch plate from hanging up on the upper front edge of the receptacle mouth when the gooseneck is inserted into the receptacle. The forwardly facing surface of the latch plate is oriented generally vertically relative to the rearwardly extending arm 26 of the gooseneck. As will be seen later, the forward surface of the latch plate 48 will abut the rearwardly facing surface of the load block 84 (FIG. 2) when the gooseneck is elevated relative to the trailer and is partially removed from the receptacle, the plate and load block thus cooperating as a safety latch mechanism.

Additionally, a primary locking member 50 (or latch plate) so projects downwardly from the male portion 36 of the rearwardly extending arm 26 of the gooseneck connector at a location immediately forward of the nose 44. As shown best in FIG. 2 and in FIG. 6, a forwardly facing surface of the primary latch plate 50 abuts against the rearwardly facing surface of the locking beam 90 to lock the gooseneck in a fully inserted position when the gooseneck is elevated relative to the vehicle.

Referring to FIGS. 2, 3, and 5, the neck portion 24 of the connector carries a transversely oriented load bearing pin 28. The pin extends through the neck portion and projects outwardly in mutually opposing directions from the sidewalls of the neck portion. The pin is reinforced by a pair of triangular webs 30 and 32 secured to the sidewalls of the neck portion 34 and the lower surfaces of the pin 28. The pin is located in the lower section of the neck portion so that, when the gooseneck is elevated relative to the vehicle, the upper surfaces of the projecting portions of the pin can engage the downwardly opening recesses 74 of the load bearing extensions 58 and 60. In this manner the pin and load bearing extensions cooperate to perform a dual function when the gooseneck is in an elevated position relative to the vehicle. First, the pin engages the load bearing extensions 58 and 60 and supports the trailer in conjunction with the load bearing block 90 and the rearwardly extending arm 26. Second, the pin and recess cooperate to provide an external, visual indication of locking of the gooseneck in the receptacle while also assisting in the locking function. This exterior coupling mechanism overcomes an operator's inability to directly observe the position of the rearwardly extending arm 26 within the receptacle.

The hitching apparatus according to the present invention is operated by first aligning the vehicle 10 with an uncoupled roll trailer 12, the forward end of which is resting on the lower transverse box beam 62. The lower arm 26 of the gooseneck connector is maintained at a lowered operative height with respect to the vehicle and roll trailer receptacle 78 by manipulation with the powered elevating apparatus 20. Inasmuch as the fifth wheel 18 permits a small amount of rotation of the gooseneck connector about a transverse, horizontal axis, the lower arm 26 is initially presentable for passage through the receptacle mouth with its lower surface 46 oriented at a small upward incline (due to the counterbalancing effect of the counterweight 22) so as to approach the ramp 94 in a somewhat parallel fashion. The small incline of the lower arm 26 allows the safety latch plate 48 to pass underneath the load block 84. For this reason it is desirable to position the safety latch 48 intermediate the ends of the connector inclined upper surface 42 so as to provide sufficient clearance between the top of the safely latch and the load block.

When the connector reaches its fully inserted position (shown in dot-dash outline in FIG. 2), the elevating apparatus 20 is actuated to lift the gooseneck upwardly relative to the vehicle. The lower arm 26 pivots about the axis of the fifth wheel causing the rearward lower surface 46 of the male portion 36 to engage the locking beam 90 and causing the latch plate 50 to move downwardly behind the locking beam 90 to lock the gooseneck in the fully inserted position. Simultaneously, the gooseneck pin 28 is moved upwardly into engagement with the lower aligning edges 76 of the forward load bearing extensions 58 and 60 and slides upwardly along these edges until engaging the semicircular recesses 74.

Should the lower, rearwardly extending arm 26 of the gooseneck not be fully inserted in the receptacle, the pin 28 will not engage the recesses 74 or the surfaces 76, but will engage the upwardly and forwardly extending cam surfaces 72 on the load bearing extensions 58 and 60. As the gooseneck is elevated relative to the vehicle, the pin 28 and cam surfaces 72 will coact to move the trailer and the gooseneck connector in mutually opposite directions. In this manner, a false coupling is prevented and a very definite indication of a false coupling is provided for the operator. The coaction of the cam surfaces and pin is especially important in those applications where the safety latching mechanism is omitted.

Referring now to FIG. 6, a preferred embodiment of the coupling device of the invention is illustrated. This embodiment omits the load bearing extensions 58 and 60 and relys on the lower, rearward load bearing beam 90 and the forward upper angle iron 84 to coact with the rearwardly extending, lower arm 26 of the gooseneck to lift the forward end of the trailer and to support the weight of the trailer when the gooseneck is elevated relative to the vehicle. Shown in dot-dash lines is the lower arm 26 of the gooseneck in the elevated, fully inserted, and locked position. As can be seen the primary latch member 50 is locked behind the lower, rear load bearing beam 90.

Should the primary latch member 50 become disengaged from the lower load bearing beam 90, or should a false coupling condition occur (where the gooseneck is not fully inserted in the receptacle so that the primary latch member rides on top of the load bearing beam 90 or on the ramp 94 when the gooseneck is elevated), the gooseneck will move forward relative to the receptacle causing the trailer to come unhitched from the vehicle. This situation can occur with undesirable results, including lost trailers, damaged cargo and injuries to personnel and equipment. A principal feature of the invention, the safety latch mechanism provides a safeguard against such occurrences. As the gooseneck moves forwardly as a result of unlocking the primary latch member 50 or as result of a false coupling, the safety latch plate 48 will engage the rearwardly facing surface of the beam 84 as shown in FIG. 6. This coaction of the safety latch plate 48 and the beam 84 will prevent further withdrawal of the gooseneck when it is elevated relative to the vehicle.

A third embodiment of the invention as illustrated in FIG. 7 includes a receptacle generally similar to that already illustrated and described herein, utilizing the load bearing and locking members shown in and described in conjunction with FIG. 6. For illustrative purposes, the parts corresponding to those already illustrated and described with respect to the first embodiment of the present invention are not further described herein, but are designated with the same reference numerals primed. The primary trailer locking members include a pair of saw tooth shaped, extension members 99 supported from the forward transverse channel 56' and extending forwardly from the forward end of the trailer on respectively opposite sides of the receptacle mouth. The lower edge of each of the extension members 99 is formed by a downwardly projecting saw tooth including a forward, rearwardly and downwardly inclined cam edge 100 which intersects with rearward, forwardly and downwardly inclined locking edge 102, which in turn intersects with a horizontal, rearwardly extending surface. This forward saw tooth is engageable along its locking edge 102 with a pin 28' projecting transversely outwardly from both sides of the intermediate segment 24' of the gooseneck. A rearwardly inclined, aligning edge 104 is formed parallel to the forward edge 100 and is offset rearwardly from the locking edge 102.

The mutually cooperable load bearing members are comprised of the load block (or beam) 84' and the intermediate portion 34' of the lower arm 26' of the gooseneck. These members are mutually engageable along their respective lower and upper horizontal surfaces. The forward extensions 99 provide visual indication to the operator of the hitching apparatus as to whether the gooseneck connector is fully locked and coupled with the trailer. The forward cam edge 100 serves the same purpose as the cam edge 72 of the first embodiment, that is to force the gooseneck out of the receptacle and thereby prevent a false coupling condition.

It will be appreciated that by this invention there is provided and improved highly effective gooseneck connector and trailer coupling and locking apparatus for hitching a powered vehicle to a roll trailer by which the above mentioned objectives are completely fulfilled. Various modifications and substitutions of equivalents can be made to the foregoing embodiments by those of ordinary skill in the art without departure from the original scope and intent of the present invention. It is therefore intended that the protection afforded the present invention will be limited only by a reasonable interpretation of the definition contained in the appended claims.

What is claimed is:

1. In an apparatus for coupling a powered vehicle to a wheeled trailer, a fifth wheel on the vehicle, means for elevating and lowering the fifth wheel relative to the vehicle, a connector including a forwardly extending arm pivotally coupled to the fifth wheel and a rearwardly extending arm, the rearwardly extending arm having upper and lower surfaces, the trailer having a forward end and a rearward end, the trailer having means for supporting the forward end above the surface on which the trailer rests, the trailer having a receptacle located on the forward end thereof, the receptacle having a fore and aft longitudinal dimension, a forward end, a rearward end, and a forwardly opening mouth through which the rearwardly extending arm of the connector can be inserted to engage the receptacle, the receptacle having means adjacent the rearward end thereof for engaging the lower surface of the rearwardly extending arm when the rearwardly extending arm is in a fully inserted position in the receptacle and when the connector is elevated relative to the vehicle, the receptacle having means adjacent the forward end thereof for engaging the upper surface of the rearwardly extending arm when the rearwardly extending arm is in a fully inserted position in the receptacle and when the connector is elevated relative to the vehicle, the forward end of said trailer thereby capable of being elevated relative to the surface on which it rests when the connector is elevated relative to the vehicle, the improvement comprising:

beam means fixed to the trailer, the beam means positioned transversely across the forward, upper portion of the receptacle, the beam means having a rearwardly facing surface, first locking means mounted on the connector and on the trailer and being mutually engageable to interlock the trailer and the connector as the latter is elevated relative to the vehicle when the rearwardly extending arm of the connector is in the fully inserted position in the receptacle, and second locking means for interlocking the connector and the trailer when the rearwardly extending arm of the connector is inserted in the receptacle to an extent less than the fully inserted position, the second locking means including a member affixed to and extending upwardly from the upper surface of the rearwardly extending arm of the connector, the member capable of engaging the rearwardly facing surface of the beam means as the rearwardly extending arm of the connector is being withdrawn in a forward direction from the receptacle when the connector is elevated relative to the vehicle, thereby preventing further withdrawal of the rearwardly extending arm from the receptacle, the member being sized such that the member is capable of disengaging from the rearwardly facing surface of the beam means as the connector is lowered relative to the vehicle to allow the rearwardly extending arm to be withdrawn in a forward direction from the receptacle to uncouple the connectors from the trailer.

2. The apparatus of claim 1 wherein said first locking means comprises:

a beam fixed to the trailer, the beam being positioned transversely across the rearward, lower portion of the receptacle, the beam having a rearwardly facing surface, and a member affixed to and extending downwardly from the lower surface of the rearwardly extending arm, the member capable of engaging the rearwardly facing surface of the beam as the rearwardly extending arm of the connector is being withdrawn in a forward direction from the receptacle when the connector is elevated relative to the vehicle and when the rearwardly extending arm is in the fully inserted position in the receptacle, the member of said second locking means being positioned forwardly of the member of the first locking means.

3. In an apparatus for coupling a powered vehicle to a wheeled trailer, a fifth wheel on the vehicle, means for elevating and lowering the fifth wheel relative to the vehicle, a connector including a forwardly extending arm pivotally coupled to the fifth wheel and a rearwardly extending arm, the rearwardly extending arm having upper and lower surfaces, the trailer having a forward end and a rearward end, the trailer having means for supporting the forward end above a surface on which the trailer rests, the trailer having a receptacle located on the forward end thereof, the receptacle having a forward end, a rearward end, and a forwardly opening mouth through which the rearwardly extending arm of the connector can be inserted to engage the receptacle, the receptacle having load bearing means toward the rearward end thereof for engaging the bottom surface of the rearwardly extending arm when a first portion of the rearwardly extending arm is in a fully inserted position in the receptacle and when the connector is elevated relative to the vehicle, the improvement comprising:

mutually engageable coupling means on the trailer and on the connector for interlocking the trailer and the connector when the connector is elevated relative to the vehicle in the fully inserted position, the coupling means including a bar oriented transversely relative to the longitudinal axis of the trailer and positioned forwardly of the mouth of the receptacle, and first extension member oriented substantially parallel to the longitudinal axis of the trailer and positioned forwardly of the forward end of the trailer, one of the extension member and the bar being fixed to the connector and the other of the extension member and the bar being fixed to the trailer, the extension member having a horizontally oriented surface portion and a transversely extending recess in the surface portion, the extension member being so oriented relative to the bar as to cause the bar to engage the recess when the connector is elevated relative to the vehicle and when the rearwardly extending arm is in a fully inserted position, thereby preventing forward or rearward relative movement between the extension member and the bar, and thereby interlocking the connector and the trailer, the extension member further having a forwardly and upwardly inclined cam surface portion positioned adjacent to the recess, the cam surface being so oriented relative to the bar and the recess as to cause the bar to engage the cam surface to move the trailer and the connector in mutually opposite directions as the connector is elevated relative to the vehicle when the connector is in less than a fully inserted position, thereby to prevent a false coupling of the trailer and the connector.

4. The improvement in the apparatus of claim 3 wherein the bar is affixed to the connector at a location forwardly of the first portion of the rearwardly extending arm and wherein the first extension member is affixed to the forward end of the trailer and extends forwardly therefrom, the bar having end portions extending outwardly from the connector in mutually opposing directions in transverse orientation relative to the trailer, the first extension member being positioned adjacent one side of the mouth, the recess in the first extension member being downwardly opening, the improvement further comprising a second extension member affixed to the forward end of the trailer and extending forwardly therefrom, the second extension member being positioned adjacent the other side of the mouth and having a bottom portion including downwardly opening and transversely extending recess therein, the second extension member being so oriented relative to the bar as to cause one end portion of the bar to engage the recess in the second extension member when the connector is elevated relative to the vehicle, the other end portion of the bar simultaneously engaging the recess in the first extension member when the connector is elevated relative to the vehicle, the second extension member further having a forwardly and upwardly inclined cam surface portion positioned adjacent to the recess, the cam surface being so oriented relative to the bar and the recess as to cause the bar to engage the cam surface to move the trailer and the connector in mutually opposite directions as the connector is elevated relative to the vehicle when the connector is in less than a fully inserted position, said cam surfaces being forwardly facing and positioned forwardly of said recesses, thereby to prevent a false coupling of the trailer and the connector.

5. The improvement in the apparatus of claim 3 wherein the bar and the extension member are so oriented relative to each other such that, as the connector is elevated relative to the vehicle, the bottom surface of the rearwardly extending arm will bear on the load bearing means in the receptacle and the bar will engage the recess in the extension member and will bear upon the extension member to elevate the forward end of the trailer, the coupling means thereby acting as a load bearing member.

6. The improvement in the apparatus of claim 3 further comprising:

beam means fixed to the trailer for bearing a portion of the load of the trailer when elevated, the beam means being positioned transversely across the forward, upper portion of the receptacle, the beam means having a lower surface which forms the top of the receptacle mouth, the extension member and the bar being oriented relative to each other such that, as the connector is elevated relative to the vehicle, the bottom surface of the rearwardly extending arm will bear on the load bearing means in the receptacle and a portion of the upper surface of the rearwardly extending arm will bear on the bottom surface of the beam means thereby elevating the forward end of the trailer while the bar engages the recess in said extension member to interlock the connector and the trailer.

* * * * *